United States Patent
Nakadai et al.

(10) Patent No.: US 9,583,119 B2
(45) Date of Patent: Feb. 28, 2017

(54) SOUND SOURCE SEPARATING DEVICE AND SOUND SOURCE SEPARATING METHOD

(71) Applicant: HONDA MOTOR CO., LTD., Tokyo (JP)

(72) Inventors: Kazuhiro Nakadai, Wako (JP); Takeshi Mizumoto, Wako (JP); Keisuke Nakamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/180,210

(22) Filed: Jun. 13, 2016

(65) Prior Publication Data

US 2016/0372129 A1 Dec. 22, 2016

(30) Foreign Application Priority Data

Jun. 18, 2015 (JP) .................................. 2015-122842

(51) Int. Cl.
| | |
|---|---|
| *G10L 15/00* | (2013.01) |
| *G10L 15/20* | (2006.01) |
| *G10L 21/028* | (2013.01) |
| *G10L 21/0216* | (2013.01) |
| *G10L 25/84* | (2013.01) |

(52) U.S. Cl.
CPC ............ *G10L 21/028* (2013.01); *G10L 25/84* (2013.01); *G10L 15/00* (2013.01); *G10L 15/20* (2013.01); *G10L 2021/02166* (2013.01)

(58) Field of Classification Search
CPC ......... G10L 2021/02166; G10L 21/028; G10L 15/20; G10L 15/00
See application file for complete search history.

(56) References Cited

U.S. PATENT DOCUMENTS

| | | | | |
|---|---|---|---|---|
| 8,073,690 B2* | 12/2011 | Nakadai | .................. | G10L 15/20 704/233 |
| 2008/0167869 A1* | 7/2008 | Nakadai | .................. | G10L 15/20 704/233 |
| 2009/0018828 A1* | 1/2009 | Nakadai | .................. | G10L 15/20 704/234 |
| 2014/0067385 A1* | 3/2014 | Oliveira | .............. | G10L 21/0208 704/226 |

(Continued)

FOREIGN PATENT DOCUMENTS

WO 2006-025106 3/2006

*Primary Examiner* — Samuel G Neway
(74) *Attorney, Agent, or Firm* — Rankin, Hill & Clark LLP

(57) ABSTRACT

A sound source separating device includes: a sound collecting unit configured to collect sound signals using a plurality of microphones; a sound source localizing unit configured to localize a sound source on the basis of the sound signals collected by the sound collecting unit; a sound source separating unit configured to separate the sound signals collected by the sound collecting unit into sound sources corresponding to the number of fixed sound sources and fixed sound source directions without using the sound source localization result from the sound source localizing unit; and a speech extracting unit configured to extract speech signals of the fixed sound sources on the basis of the sound source localization result from the sound source localizing unit and the sound source separation result from the sound source separating unit.

10 Claims, 10 Drawing Sheets

(56) References Cited

U.S. PATENT DOCUMENTS

| | | | | |
|---|---|---|---|---|
| 2015/0012268 A1* | 1/2015 | Nakadai | ................. | G10L 15/20 |
| | | | | 704/233 |
| 2015/0012269 A1* | 1/2015 | Nakadai | .............. | G10L 21/0208 |
| | | | | 704/233 |
| 2015/0088497 A1* | 3/2015 | Gomez | ............... | G10L 21/0208 |
| | | | | 704/226 |

* cited by examiner

FIG. 3

| ITEM | DETAILS | |
|---|---|---|
| NUMBER OF SOUND SOURCES | 2 | |
| SOUND SOURCE DIRECTION | DRIVER SEAT ORIENTATION | PASSENGER SEAT ORIENTATION |
| SOUND-SOURCE-LOCALIZING TRANSFER FUNCTION | TRANSFER FUNCTION FOR EACH PREDETERMINED DIRECTION AND FOR EACH PREDETERMINED POSITION FROM MICROPHONE 101-1 ⋮ TRANSFER FUNCTION FOR EACH PREDETERMINED DIRECTION AND FOR EACH PREDETERMINED POSITION FROM MICROPHONE 101-N | |
| SOUND-SOURCE-SEPARATING TRANSFER FUNCTION | TRANSFER FUNCTION FROM MICROPHONE 101-1 TO FIRST SOUND SOURCE ⋮ TRANSFER FUNCTION FROM MICROPHONE 101-N TO FIRST SOUND SOURCE TRANSFER FUNCTION FROM MICROPHONE 101-1 TO SECOND SOUND SOURCE ⋮ TRANSFER FUNCTION FROM MICROPHONE 101-N TO SECOND SOUND SOURCE | |

| PERIOD | DRIVER SEAT ORIENTATION | PASSENGER SEAT ORIENTATION |
|---|---|---|
| t1~t2 | 1 | 0 |
| t2~t3 | 1 | 1 |
| t3~t4 | 0 | 1 |
| t4~t5 | 0 | 0 |
| t5~t6 | 1 | 0 |
| t6~t7 | 1 | 1 |
| t7~t8 | 0 | 1 |

FIG. 10

| ITEM | DETAILS | | |
|---|---|---|---|
| NUMBER OF SOUND SOURCES | 3 | | |
| SOUND SOURCE DIRECTION | DRIVER SEAT ORIENTATION | PREDETERMINED DIRECTION | PASSENGER SEAT ORIENTATION |
| SOUND-SOURCE-LOCALIZING TRANSFER FUNCTION | TRANSFER FUNCTION FOR EACH PREDETERMINED DIRECTION AND FOR EACH PREDETERMINED POSITION FROM MICROPHONE 101-1 ⋮ TRANSFER FUNCTION FOR EACH PREDETERMINED DIRECTION AND FOR EACH PREDETERMINED POSITION FROM MICROPHONE 101-N ⋮ | | |
| SOUND-SOURCE-SEPARATING TRANSFER FUNCTION | TRANSFER FUNCTION FROM MICROPHONE 101-1 TO FIRST SOUND SOURCE ⋮ TRANSFER FUNCTION FROM MICROPHONE 101-N TO FIRST SOUND SOURCE TRANSFER FUNCTION FROM MICROPHONE 101-1 TO SECOND SOUND SOURCE ⋮ TRANSFER FUNCTION FROM MICROPHONE 101-N TO SECOND SOUND SOURCE TRANSFER FUNCTION FROM MICROPHONE 101-1 TO VIRTUAL SOUND SOURCE ⋮ TRANSFER FUNCTION FROM MICROPHONE 101-N TO VIRTUAL SOUND SOURCE | | |

| PERIOD | DRIVER SEAT ORIENTATION | PASSENGER SEAT ORIENTATION | PREDETERMINED DIRECTION |
|---|---|---|---|
| t1~t2 | 1 | 0 | 0 |
| t2~t3 | 1 | 1 | 0 |
| t3~t4 | 0 | 1 | 0 |
| t4~t5 | 0 | 0 | 0 |

…

SOUND SOURCE SEPARATING DEVICE AND SOUND SOURCE SEPARATING METHOD

CROSS-REFERENCE TO RELATED APPLICATION

Priority is claimed on Japanese Patent Application No. 2015-122842, filed on Jun. 18, 2015, the content of which is incorporated herein by reference in its entirety.

BACKGROUND OF THE INVENTION

Field of the Invention

The present invention relates to a sound source separating device and a sound source separating method.

Description of Related Art

In a vehicle, a speech recognition system for operating a navigation system or the like with a voice command has been proposed. In such a speech recognition system, for example, when a vehicle travels on an expressway or when music is played in a vehicle, a speech recognition rate is likely to decrease due to mixture of large noise from the surroundings.

Accordingly, in the speech recognition system, a sound source position of speech of a speaker sitting in a seat is stored as preset information in advance for each seat position. In the speech recognition system, a process of retrieving the preset information on the basis of the seat position detected by a sensor, separating the speech of the speaker with reference to the retrieved preset information, and recognizing the speech has been proposed (for example, see Republished Japanese Translation No. WO2006/025106 of the PCT international Publication for Patent Application).

A sound source separating device according to the related art that separates sound sources will be described below in brief.

FIG. 14 is a block diagram illustrating a schematic configuration of a sound source separating device 900 according to the related art. As illustrated in FIG. 14, the sound source separating device 900 according to the related art includes a sound collecting unit 911, a sound signal acquiring unit 912, a sound source localizing unit 913, and a sound source separating unit 914.

The sound collecting unit 911 is a microphone array including N (where N is an integer equal to or greater than 2) microphones. The sound collecting unit 911 collects sound signals and outputs the N collected sound signals to the sound signal acquiring unit 912.

The sound signal acquiring unit 912 acquires the N sound signals output from the N microphones of the sound collecting unit 911 and outputs the N acquired sound signals to the sound source localizing unit 913 and the sound source separating unit 914. The sound source localizing unit 913 estimates a direction of a sound source (which is also referred to as sound source localization) from the N sound signals output from the sound signal acquiring unit 912, for example, using a multiple signal classification (MUSIC) method and outputs information indicating the estimated direction of a sound source to the sound source separating unit 914. The number of sound sources which are localized by the sound source localizing unit 913 dynamically varies depending on an environment in which the sound source separating device 900 is used.

The sound source separating unit 914 separates the sound source on the basis of the information indicating the direction of the sound source which is output from the sound source localizing unit 913 in response to the sound signals output from the sound signal acquiring unit 912, for example, using a geometrically constrained high-order decorrelation-based source separation with adaptive step-size control (GHDSS-AS) method which is a hybrid of blind source separation and beam forming. In the GHDSS-AS method, a separation signal is estimated from the collected sound signals using a separation matrix. When a sound source is separated using the separation matrix W in this way, it is known that stability of the separation matrix affects sound source separation performance. The sound source separating unit 914 updates the separation matrix only when a direction of a sound source is detected by the sound source localizing unit 913.

SUMMARY OF THE INVENTION

However, in the related art, when an utterance is detected, the separation matrix may be reset. When the separation matrix is reset, it takes time for the separation matrix to converge. Accordingly, in the related art, the stability of the separation matrix may be poor until the separation matrix converges, and the sound source separation performance may degrade.

Aspects of the present invention are made in consideration of the above-mentioned circumstances and an object thereof is to provide a sound source separating device and a sound source separating method which can improve sound source separation performance.

The present invention employs the following aspects to achieve the above-mentioned object.

(1) According to an aspect of the present invention, there is provided a sound source separating device including: a sound collecting unit configured to collect sound signals using a plurality of microphones; a sound source localizing unit configured to localize a sound source on the basis of the sound signals collected by the sound collecting unit; a sound source separating unit configured to separate the sound signals collected by the sound collecting unit into sound sources corresponding to a number of fixed sound sources and fixed sound source directions without using the sound source localization result from the sound source localizing unit; and a speech extracting unit configured to extract speech signals of the fixed sound sources on the basis of the sound source localization result from the sound source localizing unit and the sound source separation result from the sound source separating unit.

(2) In the sound source separating device according to the aspect of (1), the sound source localizing unit may detect a speech section for each sound source, and the speech extracting unit may extract speech signals in a period in which the fixed sound sources produce speech on the basis of the sound source localization result and the detected speech section from the sound source localizing unit and the sound source separation result from the sound source separating unit.

(3) In the sound source separating device according to the aspect of (1) or (2), the sound source separating unit may separate the sound signals into the number of the fixed sound sources using a separation matrix and may update the separation matrix for every predetermined time even in a non-utterance period.

(4) In the sound source separating device according to any one aspect of (1) to (3), the sound source separating unit may separate the sound signals into the number of sound sources using a separation matrix and may not reset the separation matrix when speech is detected.

(5) In the sound source separating device according to the aspect of (1) or (2), the fixed sound sources may be a driver in a driver seat and a passenger in a passenger seat of a vehicle.

(6) In the sound source separating device according to the aspect of (5), a sound source other than the driver and the passenger may be additionally allocated to the fixed sound sources.

(7) In the sound source separating device according to any one aspect of (1) to (6), the sound collecting unit may be disposed between a driver seat and a passenger seat of a vehicle.

(8) In the sound source separating device according to any one aspect of (1) to (7), the sound collecting unit may be disposed between a map lamp and an instrument panel.

(9) The sound source separating device according to any one of (1) to (8) may further include a sound source information storage unit configured to store information on the fixed sound sources, and the sound source separating unit may separate the sound signals into a number of the fixed sound sources using the information stored in the sound source information storage unit.

(10) According to another aspect of the present invention, there is provided a sound source separating method including: a sound collecting step of collecting sound signals using a plurality of microphones; a sound source localizing step of localizing a sound source on the basis of the sound signals collected in the sound collecting step; a sound source separating step of separating the sound signals collected in the sound collecting step into sound sources corresponding to the number of fixed sound sources and fixed sound source directions without using the sound source localization result in the sound source localizing step; and a speech extracting step of extracting speech signals of the fixed sound sources on the basis of the sound source localization result in the sound source localizing step and the sound source separation result in the sound source separating step.

According to the configurations of (1) and (10), since the microphones, the number of sound sources, and the sound source directions are fixed, the rows and the columns of the separation matrix W which is used to separate the sound sources do not vary. Accordingly, according to the configurations of (1) and (10), since the separation matrix W is stabilized, the separation matrix W is more stable and thus the sound source separation performance is more stable in comparison with a case in which the sound sources are separated using the directions of the sound sources which are localized.

According to the configuration of (2), it is possible to extract a speech signal in an utterance period for each sound source.

According to the configuration of (3), since the sound sources can be separated using the converging separation matrix W, it is possible to stabilize the sound source separation performance.

According to the configuration of (4), the separation matrix W is not reset but continues to be updated when speech is detected. Accordingly, the separation matrix is in a converging state and is always stable. As a result, according to the configuration of (4), it is possible to stabilize the sound source separation performance.

According to the configuration of (5), it is possible to accurately separate the speech signal of the driver sitting in the driver seat and the speech signal of the passenger sitting in the passenger seat.

According to the configuration of (6), since noise in the sound source separating device such as road noise, air-conditioner noise, and sound signals of a car stereo system can be absorbed in a virtual sound source in a predetermined direction, it is possible to further improve separation characteristics of the sound signals corresponding to the number of fixed sound sources and the fixed sound source directions.

According to the configuration of (7) or (8), it is possible to collect the speech signal of the driver sitting in the driver seat and the speech signal of the passenger sitting in the passenger seat.

According to the configuration of (9), it is possible to perform sound source separation on the basis of the information of the number of sound sources and the sound source directions stored in the sound source information storage unit using the stable separation matrix W in which the number of rows and the number of columns are fixed.

BRIEF DESCRIPTION OF THE DRAWINGS

FIG. 3 is a diagram illustrating an example of information which is stored in a sound source information storage unit according to the first embodiment.

FIG. 10 is a diagram illustrating an example of information which is stored in a sound source information storage unit according to the second embodiment.

DETAILED DESCRIPTION OF THE INVENTION

Hereinafter, embodiments of the present invention will be described with reference to the accompanying drawings. In the following description, an example in which a sound source separating device is installed in a vehicle will be described.

First Embodiment

<Arrangement of Sound Collecting Unit, Positions of Speakers, Fixed Sound Sources>

First, an example of an arrangement of a sound collecting unit 11, which collects sound signals, in a vehicle 2, positions of speakers, and fixed sound source directions will be described below.

Figure 1:
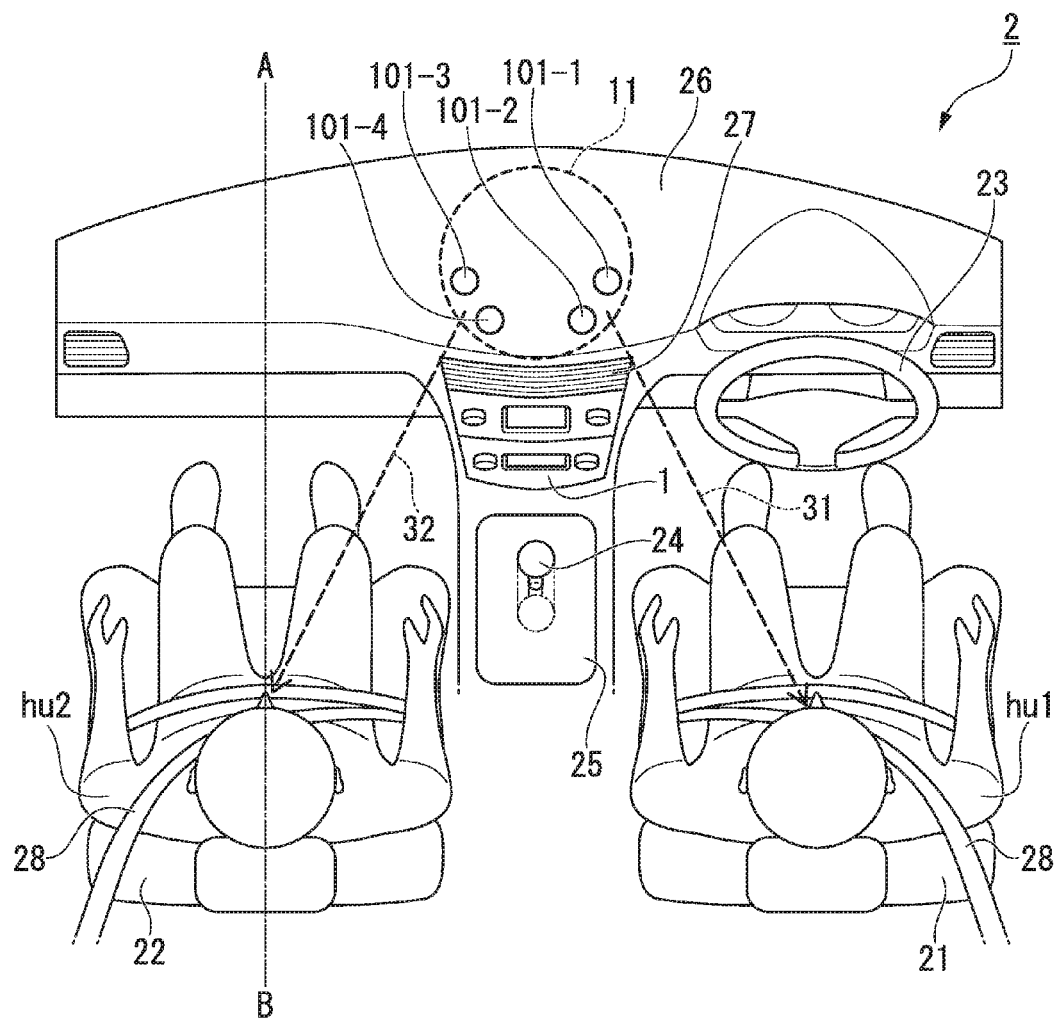
FIG. 1 is a diagram illustrating an example of an arrangement of a sound collecting unit, positions of speakers, and fixed sound source directions in a vehicle interior of a vehicle according to a first embodiment.

FIG. 1 is a diagram illustrating an example of an arrangement of the sound collecting unit 11, positions of speakers, and fixed sound source directions in a vehicle interior of the vehicle 2 according to this embodiment.

The vehicle 2 illustrated in FIG. 1 is a so-called right-hand-drive vehicle in which a driver seat 21 is disposed on the right side in the vehicle interior and a passenger seat 22 is disposed on the left side in the vehicle interior. A steering wheel 23 is disposed on the right side in the vehicle interior. A shift panel 25 in which a shift lever 24 protrudes is disposed between the driver seat 21 and the passenger seat 22. The shift panel 25 is disposed at a position protruding upward from the floor of the driver seat 21 and the passenger seat 22. The front part of the shift panel 25 is disposed to extend continuously from a center panel 27 extending at the center in the vehicle width direction of an instrument panel 26. A sound source separating device 1, an audio unit, and an air conditioner are arranged in the center panel 27. The sound collecting unit 11 is disposed between the driver seat 21 and the passenger seat 22, for example, on the ceiling of the vehicle 2. The arrangement of the sound collecting unit 11 is not limited to this configuration and the sound collecting unit 11 may be disposed between the driver seat 21 and the passenger seat 22 or between a map lamp 29 (see FIG. 8) and the instrument panel 26.

In the example illustrated in FIG. 1, a driver hu1 sits in the driver seat 21 and a passenger hu2 sits in the passenger seat 22. Since the driver hu1 sits in the driver seat 21 with a safety belt 28 fastened, the driver does not move from the driver seat 21. Similarly, since the passenger hu2 sits in the passenger seat 22 with a safety belt 28 fastened, the passenger does not move from the passenger seat 22. Sound sources in this embodiment are the driver hu1 and the passenger hu2, and positions and directions of the two sound sources relative to the sound collecting unit 11 can be considered to be fixed.

In this way, in this embodiment, the number of sound sources is fixed to two of the driver hu1 and the passenger hu2 and the sound source directions are fixed to two of a driver seat orientation and a passenger seat orientation.

In the example illustrated in FIG. 1, the sound collecting unit 11 includes four microphones 101-1 to 101-4. The microphones 101-1 and 101-2 are disposed to face the driver seat 21, and the microphones 101-3 and 101-4 are disposed to face the passenger seat 22. The number of microphones 101 is not limited thereto as long as the number of microphones is equal to or greater than the number of sound sources.

<Configuration of Sound Source Separating Device>

A sound source separating device will be described below.

Figure 2:
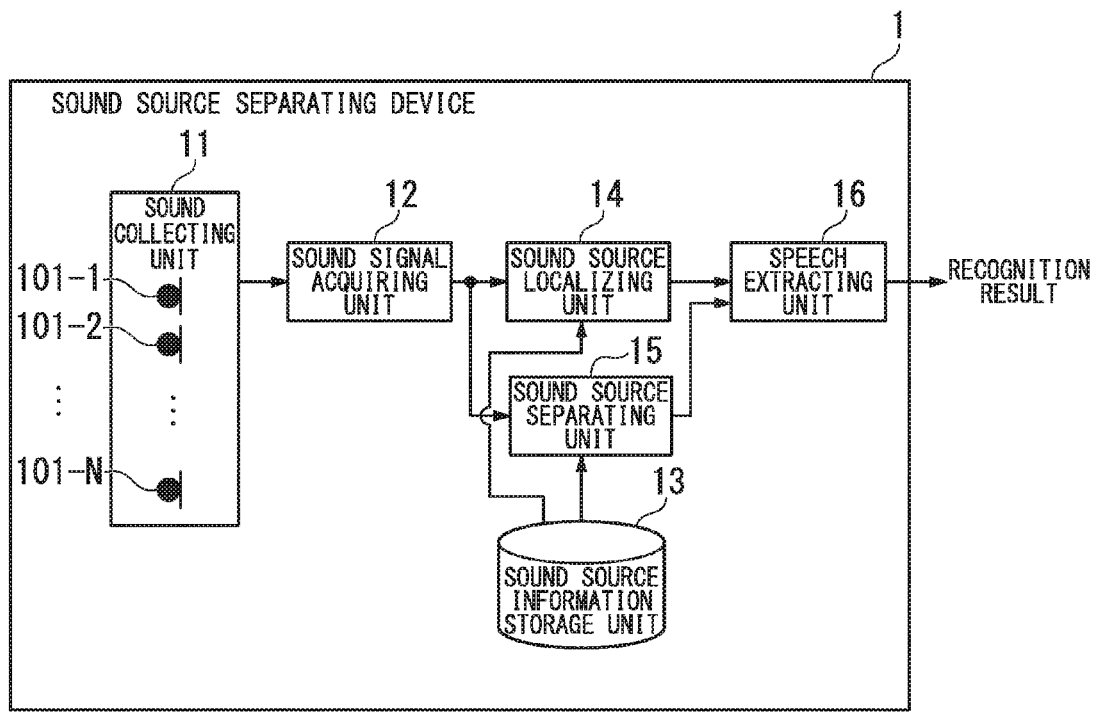
FIG. 2 is a block diagram illustrating a configuration of a sound source separating device according to the first embodiment.

FIG. 2 is a block diagram illustrating a configuration of the sound source separating device 1 according to this embodiment.

As illustrated in FIG. 2, the sound source separating device 1 includes a sound collecting unit 11, a sound signal acquiring unit 12, a sound source information storage unit 13, a sound source localizing unit 14, a sound source separating unit 15, and a speech extracting unit 16.

The sound collecting unit 11 is a microphone and includes microphones 101-1 to 101-N (where N is an integer equal to or greater than 2). The sound collecting unit 11 is a microphone array. When none of the microphones 101-1 to 101-N is being mentioned specifically, they are referred to as microphones 101. The sound collecting unit 11 converts collected sound signals into electrical signals and outputs the converted sound signals to the sound signal acquiring unit 12. The sound collecting unit 11 may transmit the collected sound signals of N channels to the sound signal acquiring unit 12 in a wireless or wired manner. The sound signals of the channels need only be synchronized at the time of transmission.

The sound signal acquiring unit 12 acquires the sound signals of N channels which are collected by the N microphones 101 of the sound collecting unit 11. The sound signal acquiring unit 12 performs, for example, a discrete Fourier transform (DFT) on the speech signal $x_i(k)$ for each channel i (where k is an integer indicating a sampling time and i is an integer satisfying $1 \leq i \leq N$) of the acquired sound signals of N channels to generate a frequency-domain signal $x_i(\omega)$ (where $\omega$ is the frequency) and outputs the generated frequency-domain signal $x_i(\omega)$ to the sound source localizing unit 14 and the sound source separating unit 15.

As illustrated in FIG. 3, the number of sound sources, sound source directions, sound-source-localizing transfer functions, and sound-source-separating transfer functions are stored in the sound source information storage unit 13. FIG. 3 is a diagram illustrating an example of information which is stored in the sound source information storage unit 13 according to this embodiment.

As illustrated in FIG. 3, in the sound source information storage unit 13, 2 is stored as the number of sound sources and a driver seat orientation and a passenger seat orientation are stored in correlation therewith as the sound source directions. In this embodiment, the driver hu1 is also referred to as a first sound source and the passenger hu2 is also referred to as a second sound source. In the sound source information storage unit 13, sound-source-localizing transfer functions $a_{\phi i}(\omega)$ from the microphones 101 to a predetermined position at a predetermined angle in a direction for each predetermined angle and for each microphone 101 and for each predetermined position. The predetermined angle is, for example, 5 degrees. The predetermined position is a position in a two-dimensional space or a position in a three-dimensional space. In the sound source information storage unit 13, sound-source-separating transfer functions $a_{\phi i}(\omega)$ to the sound sources (the first sound source and the second source) are stored for each microphone 101. An N-dimensional vector $[a_{\phi 1}(\omega), a_{\phi 2}(\omega), a_{\phi N}(\omega)]$ having the transfer functions $a_{\phi i}(\omega)$ as elements is referred to as a transfer function vector $va_\phi(\omega)$.

In the example illustrated in FIG. 3, a sound-source-localizing transfer function is stored in the sound source information storage unit 13 for each predetermined direction and for each predetermined position, but the present invention is not limited to this example. The sound-source-localizing transfer function for each predetermined orientation may be stored in the sound source information storage unit 13 for each microphone 101.

In the example illustrated in FIG. 3, the sound-source-localizing transfer functions and the sound-source-separating transfer functions are stored in the sound source information storage unit 13, but the present invention is not limited to this example. For example, only the transfer functions described as the sound-source-localizing transfer functions among the transfer functions illustrated in FIG. 3 may be stored in the sound source information storage unit 13. In this case, in the sound source information storage unit 13, the direction of the microphone 101 toward the first sound source, the position of the first sound source, the direction of the microphone 101 toward the second sound source, and the position of the second sound source for each microphone 101 may be stored as the information indicating the sound source directions. In this case, the sound source separating unit 15 may read and use the transfer functions corresponding to the sound source directions and the sound source positions from the sound source information storage unit 13 on the basis of the information indicating the directions of the microphones 101 to the sound sources and the positions of the sound sources.

Figure 4:
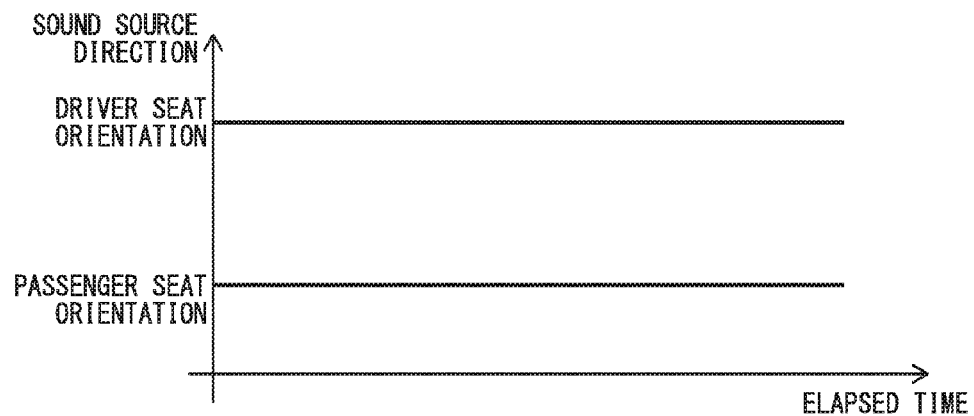
FIG. 4 is a diagram illustrating an example in which the number of sound sources and the sound source directions which are stored in the sound source information storage unit according to the first embodiment are fixed with the passage of time.

As illustrated in FIG. 4, the number of sound sources and the sound source directions do not vary with the passage of time but are fixed. FIG. 4 is a diagram illustrating an example in which the number of sound sources and the sound source directions which are stored in the sound source information storage unit 13 according to this embodiment are fixed with the passage of time. In FIG. 4, the horizontal axis represents the elapsed time and the vertical axis represents the sound source direction. As illustrated in FIG. 4, the number of sound sources is fixed to two sound sources in the driver seat orientation and the passenger seat orientation regardless of the passage of time. The sound source directions are fixed to two directions of the driver seat orientation and the passenger seat orientation regardless of the passage of time.

Description of the sound source separating device 1 will continue with reference to FIG. 2.

The sound source localizing unit 14 estimates the sound source directions of the sound sources using the transfer functions stored in the sound source information storage unit 13 in response to the frequency-domain signals $x_i(\omega)$ input from the sound signal acquiring unit 12. The sound source localizing unit 14 outputs sound source localization information which is the estimation result to the speech extracting unit 16. The sound source localizing unit 14 estimates the directions of the sound sources, for example, using a multiple signal classification (MUSIC) method. Accordingly, when a value greater than a predetermined threshold value is acquired from a MUSIC spectrum, the sound source localizing unit 14 simultaneously performs sound source localization and speech section estimation. Accordingly, the sound source localization information S includes information indicating the sound source direction and information indicating the speech section for each sound source. The sound source localization method will be described later.

The sound source localizing unit 14 may calculate the sound source directions and the speech sections using another method instead of the MUSIC method. The sound source localizing unit 14 may use, for example, a generalized eigenvalue decomposition (GEVD)-MUSIC method. Alternatively, the sound source localizing unit 14 may detect the speech sections after performing the sound source localization using a beam forming method.

Figure 5:
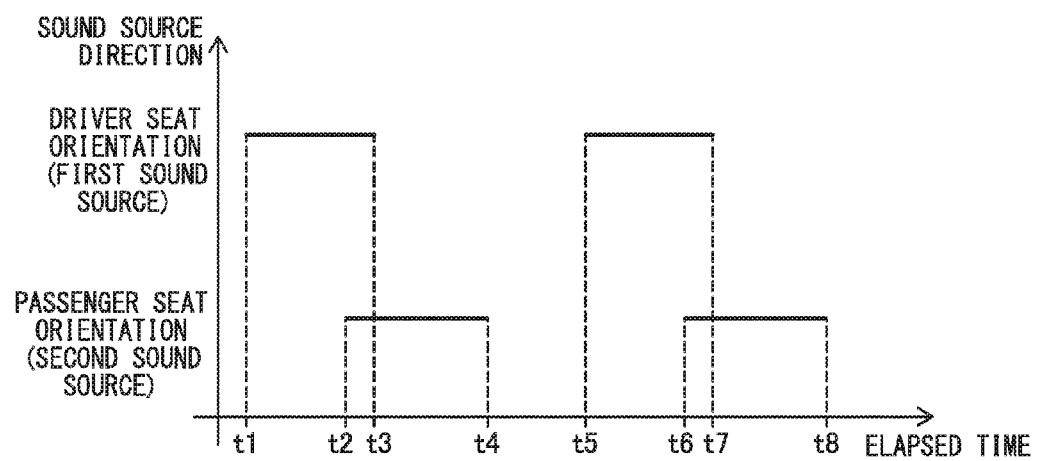
FIG. 5 is a diagram illustrating an example of the sound source directions which are localized by a sound source localizing unit according to the first embodiment and an elapsed time.

FIG. 5 is a diagram illustrating an example of the sound source directions which are localized by the sound source localizing unit 14 according to the first embodiment and the elapsed time. In FIG. 5, the horizontal axis represents the elapsed time and the vertical axis represents the sound source direction. In the example illustrated in FIG. 5, similarly to the example illustrated in FIG. 1, persons sit in the driver seat 21 and the passenger seat 22 and produce speech. For example, the first sound source which is localized as the driver seat orientation corresponds to speech of the driver hu1, and the second sound source which is localized as the passenger seat orientation corresponds to speech of the passenger hu2.

The number of sound source directions which are localized by the sound source localizing unit 14 varies with the passage of time as illustrated in FIG. 5. In the example illustrated in FIG. 5, the first sound source produces speech in periods of times t1 to t3 and times t5 to t7, and the second sound source produces speech in periods of times t2 to t4 and times t6 to t8.

Figures 6, 7:
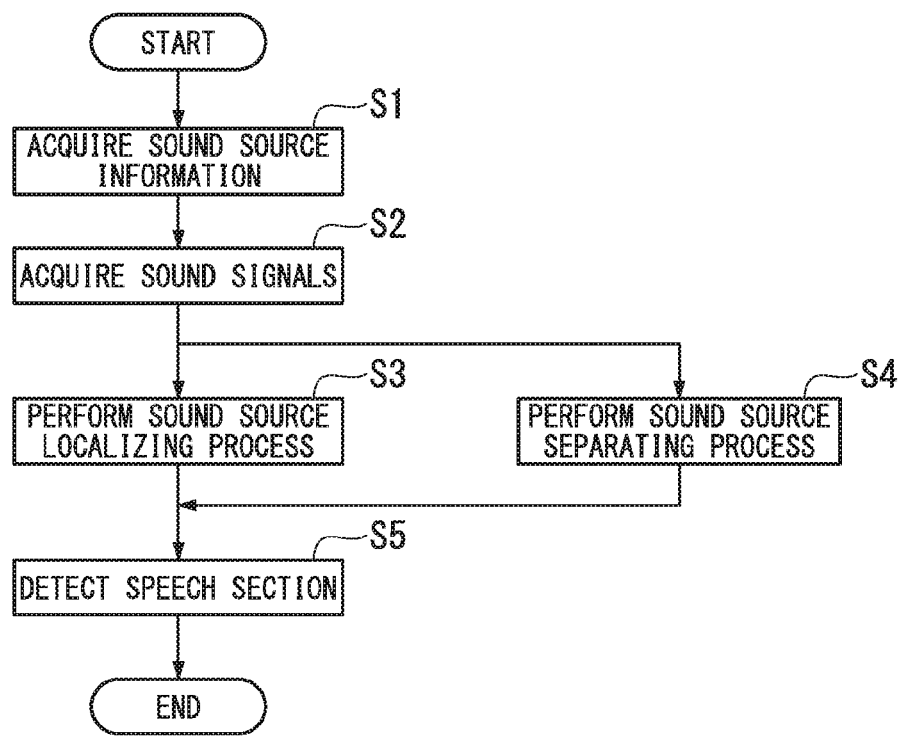
FIG. 6 is a diagram illustrating an example of sound source localization information which is output from the sound source localizing unit according to the first embodiment.
FIG. 7 is a flowchart illustrating an example of a process which is performed by the sound source separating device according to the first embodiment.

FIG. 6 is a diagram illustrating an example of the sound source localization information S which is output from the sound source localizing unit 14 according to this embodiment. FIG. 6 also illustrates the sound source localization information S based on the sound source localization result illustrated in FIG. 5.

As illustrated in FIG. 6, in the sound source localization information S, an utterance is correlated with the sound source direction for each period. In FIG. 6, "1" indicates an utterance state and "0" indicates a non-utterance state. In the period of times t1 to t2 and the period of times t5 to t6, there is an utterance from the driver seat orientation (the first sound source) and thus this is set to "1", and there is no utterance from the passenger seat orientation (the second source) and thus this is set to "0". In the period of times t2 to t3 and the period of times t6 to t7, there is an utterance from the driver seat orientation and thus this is set to "1", and there is an utterance from the passenger seat orientation and thus this is set to "1". In the period of times t3 to t4 and the period of times t7 to t8, there is no utterance from the driver seat orientation and thus this is set to "0", and there is an utterance from the passenger seat orientation and thus this is set to "1". In the period of times t4 to t5, there is no utterance from the driver seat orientation and thus this is set to "0", and there is no utterance from the passenger seat orientation and thus this is set to "0".

Description of the sound source separating device 1 will continue with reference to FIG. 2.

The sound source separating unit 15 separates the frequency-domain signals $x_i(\omega)$ of N channels output from the sound signal acquiring unit 12 into sound signals by sound sources using the number of sound sources, the sound source directions, and the sound-source-separating transfer functions which are stored in the sound source information storage unit 13. That is, the sound source separating unit 15 separates the frequency-domain signals $x_i(\omega)$ of N channels into the first sound source and the second sound source using two sound sources of the first sound source in the driver seat orientation and the second sound source in the passenger seat orientation, the transfer function corresponding to the first sound source, and the transfer function corresponding to the second sound source which are stored in the sound source information storage unit 13. The sound source separating unit 15 outputs the separated sound signal in the driver seat orientation and the separated sound signal in the passenger seat orientation to the speech extracting unit 16. Even when only the driver hu1 (FIG. 1) sits in the driver seat, the sound source separating unit 15 separates the acquired sound signals into two sound signals of the first sound source in the driver seat orientation and the second sound source in the passenger seat orientation. The sound source separating unit 15 generates a separation matrix W based on the number of sound sources and the sound source directions, for example, using a geometrically constrained high-order decorrelation-based source separation with adaptive step-size control (GHDSS-AS) method which is a hybrid of blind source separation and beam forming, and separates the sound signals into sound signals by sound sources using the generated separation matrix W. The initial value of the separation matrix W may be stored in the sound source information storage unit 13. The sound source separating unit 15 updates the separation matrix W which is an Nx2 matrix using the GHDSS-AS method and separates the sound signals into sound signals by sound sources using the updated separation matrix W. The sound source separating method will be described later.

Unlike in the related art, the sound source separating unit 15 updates the separation matrix W for each frame regardless of detection of speech or detection of a sound source orientation. Here, a frame is a unit of data to be analyzed and has, for example, a frame length of 25 (msec) and a frame interval of 10 (msec). Unlike in the related art, the sound source separating unit 15 does not reset the separation matrix W even when speech is detected. Accordingly, in this embodiment, the separation matrix W which is used by the sound source separating unit 15 continues to be updated without being reset even when speech is detected. Accordingly, the separation matrix W is in a converged state and thus is always stable. As a result, according to this embodiment, it is possible to stabilize the sound source separation performance.

The speech extracting unit 16 extracts a speech signal of a speaker having produced speech from the sound signals by sound sources output from the sound source separating unit 15 using the sound source localization information S output from the sound source localizing unit 14. Alternatively, the speech extracting unit 16 extracts the speech signal in a speech section for each speaker on the basis of the sound source localization information S output from the sound source localizing unit 14. The speaker is any one of the driver hu1 and the passenger hu2 as described above. The speech extracting method will be described later. The speech extracting unit 16 performs an inverse Fourier transform on the extracted speech signal for each speaker for each frequency to transform the speech signal into a time-domain signal. The speech extracting unit 16 outputs the converted speech signal for each speaker as a recognition result to an external device such as a navigation system (not illustrated).

<Process of Sound Source Separating Device 1>

An example of a process flow which is performed by the sound source separating device 1 will be described below.

FIG. 7 is a flowchart illustrating an example of a process which is performed by the sound source separating device 1 according to this embodiment.

(step S1) The sound source separating unit 15 reads the sound-source-separating transfer functions corresponding to the number of sound source directions and the directions and positions of separation targets which are stored in the sound source information storage unit 13.

(step S2) The sound signal acquiring unit 12 acquires N sound signals which are collected by the N microphones 101 of the sound collecting unit 11.

(step S3) The sound source localizing unit 14 reads a plurality of sound-source-localizing transfer functions which are stored in the sound source information storage unit 13. Subsequently, the sound source localizing unit 14 performs estimation of the sound source directions of the sound sources and estimation of a speech section for each estimated sound source direction on the N sound signals output from the sound signal acquiring unit 12 on the basis of the read plurality of sound-source-localizing transfer functions read from the sound source information storage unit 13, for example, using the MUSIC method. Subsequently, the sound source localizing unit 14 generates the sound source localization information S including the estimated sound source directions of the sound sources and the speech section for each estimated sound source direction.

(step S4) The sound source separating unit 15 separates the N sound signals output from the sound signal acquiring unit 12 into the sound signals by sound sources on the basis of the number of sound source directions and the sound-source-separating transfer functions corresponding to the directions and positions of the separation targets which are read from the sound source information storage unit 13, for example, using the GHDSS-AS method.

The process of step S3 and the process of step S4 are performed in parallel. (step S5) The speech extracting unit 16 extracts a speech signal of a speaker having produced speech from the sound signals separated by the sound source separating unit 15 on the basis of the sound source localization information S output from the sound source localizing unit 14.

The sound source separating device 1 performs the processes of steps S2 to S5, for example, for each frame.

<Sound Source Localization>

Here, the estimation of sound source localization using the MUSIC method (for example, see Citation 1) will be described in brief.

The sound source localizing unit 14 calculates an N×N correlation matrix $R(\omega)$ having cross correlations of the frequency-domain signals $x_i(\omega)$ as elements for each frequency $\omega$, for example, using Equation (1).

$$R(\omega) = E[vx(\omega)vx^H(\omega)] \quad (1)$$

In Equation (1), $E[\ldots]$ denotes an expected value of $\ldots$ $vx(\omega)$ denotes an N-dimensional vector $[x_1(\omega), x_2(\omega), x_N(\omega)]$ having the frequency-domain signals $x_i(\omega)$ as elements. H denotes a conjugate transpose of a vector or a matrix.

The sound source localizing unit 14 calculates N eigenvalues $\lambda_i(\omega)$ and eigenvectors $e_i(\omega)$ by eigenvalue-developing the correlation matrix $R(\omega)$. The correlation matrix $R(\omega)$, the eigenvalues $\lambda_i(\omega)$, and the eigenvectors $e_i(\omega)$ satisfy the relationship expressed by Equation (2).

$$R(\omega) = E(\omega)\Lambda(\omega)E^{-1}(\omega) \quad (2)$$

In Equation (2), $E(\omega)$ denotes an N×N matrix $[e_1(\omega), e_2(\omega), \ldots, e_N(\omega)]$ having the eigenvectors $e_i(\omega)$ as elements. $\Lambda(\omega)$ denotes an N×N diagonal matrix having N eigenvalues $\lambda_1(\omega), \lambda_2(\omega), \ldots,$ and $\lambda_N(\omega)$ as diagonal elements. Here, index i denotes the order of the eigenvectors $e_i(\omega)$ in the matrix $E(\omega)$ and the order of the eigenvalues $\lambda_i(\omega)$ in the matrix $\Lambda(\omega)$. The sound source localizing unit 14 determines the index i in descending order of the eigenvalues $\lambda_i(\omega)$ to be 1 for the maximum eigenvalue $\lambda_i(\omega)$ and to be N for the minimum eigenvalue $\lambda_i(\omega)$.

The sound source localizing unit 14 reads the sound-source-localizing transfer function vector $va_\phi(\omega)$ for each sound source direction $\phi$ from the sound source information storage unit 13 and calculates a MUSIC estimator $P(\omega,\phi)$ as an indicator for each frequency on the basis of the read transfer function vector $va_\phi(\omega)$ and the calculated eigenvectors $e_i(\omega)$, for example, using Equation (3).

$$P(\omega, \phi) = \frac{|va_\phi^H(\omega)va_\phi(\omega)|}{\sum_{i=L+1}^{N}|va_\phi^H(\omega)e_i(\omega)|} \quad (3)$$

In Equation (3), L denotes a predetermined number of sound sources and is an integer equal to or greater than 1 and less than N. $e_i(\omega)$ denotes an eigenvector.

The sound source localizing unit 14 calculates a spatial spectrum $P(\phi)$ in a predetermined frequency band of speech for each detected sound source direction $\phi$ on the basis of the MUSIC estimator $P(\omega,\phi)$ and the maximum eigenvalue $\lambda_1(\omega)$, for example, using Equation (4).

$$P(\phi) = \sum_{\omega=\omega_{min}}^{\omega_{max}} \sqrt{\lambda_1(\omega)}\, P(\omega, \phi) \quad (4)$$

In Equation (4), walla denotes the minimum frequency of the frequency band and $\omega_{max}$ denotes the maximum frequency. That is, Equation (4) represents that the spatial spectrum $P(\phi)$ is calculated by adding products of square roots of the MUSIC estimator $P(\omega,\phi)$ and the maximum eigenvalue $\lambda_1(\omega)$ over the frequency components.

The sound source localizing unit 14 extracts the values equal to or greater than a predetermined threshold value from the spatial spectrum $P(\phi)$.

The sound source localizing unit 14 generates the sound source localization information S including the sound source directions $\phi$ corresponding to the extracted values. By performing the sound source localization in this way, it is possible to detect that the driver hu1 or the passenger hu2 produces speech and a speech section even when a position of a person sitting in the driver seat or the passenger seat shifts.

Citation 1: Schmidt, 1986; Dan'es et al., 2010
<Sound Source Separation>

The sound source separation using the GHDSS-AS method will be described below in brief.

In this embodiment, the number of sound sources is M (=2) and the number of microphones 101 is N (≥M). It is assumed that a vector of spectrums of M sound sources at the frequency $\omega$ is defined as $u(\omega)=[s_1(\omega), s_2(\omega), s_M(\omega)]^T$ and a vector of spectrums of the sound signals collected by the N microphones 101 at the frequency $\omega$ is defined as $\omega,x(\omega)=[x_1(\omega), x_2(\omega), \ldots, x_N(\omega)]^T$. The superscript T denotes a transpose. $x(\omega)$ is expressed by Equation (5).

$$x(\omega)=D(\omega)u(\omega) \quad (5)$$

In Equation (5), $D(\omega)$ denotes a transfer function matrix between the sound sources and the microphones 101, and each element $H_{nm}$ in the transfer function matrix denotes the transfer function $a_\phi(\omega)$ from the m-th sound source to the m-th microphone 101. Here, the sound source separation is expressed by Equation (6).

$$y(\omega)=W(\omega)x(\omega) \quad (6)$$

In Equation (6), $W(\omega)$ is a separation matrix.

The sound source separating unit 15 uses, for example, two cost functions of separation sharpness Jss corresponding to the blind source separation and a geometric constraint JGC corresponding to the beam forming, which are expressed by Equations (7) and (8), to calculate the separation matrix $W(\omega)$.

$$J_{SS}(W)=\|\phi(y)y^H-\mathrm{diag}[\phi(y)y^H]\|^2 \quad (7)$$

$$J_{GC}(W)=\|\mathrm{diag}[WD-I]\|^2 \quad (8)$$

In Equations (7) and (8), $\|\ldots\|^2$ denotes a Frobenius norm of a matrix . . . . The Frobenius norm is a square sum (scalar value) of element values of the matrix. diag[ . . . ] denotes the total sum of the diagonal elements of the matrix . . . $\phi(y)$ is a nonlinear function and is defined by Equation (9).

$$\phi(y)=[\phi(y_1),\phi(y_2),\ldots,\phi(y_N)]^T \quad (9)$$

In Equation (9), $\phi(y_i)$ is defined, for example, by Equation (10).

$$\phi(y_i)=\tan h(\eta|y_i|)e^{j\cdot\Theta(y_i)} \quad (10)$$

In Equation (10), $\eta$ denotes a scale parameter.
The final cost function $J(W)$ is expressed by Equation (11).

$$J(W)=\alpha J_{SS}(W)+J_{GC}(W) \quad (11)$$

In Equation (11), a denotes a weighting parameter of two cost functions.

The sound source separating unit 15 updates the separation matrix $W(\omega)$, for example, for each frame using Equation (12).

$$W_{t+1}=W_t-\mu_{SS}J'_{SS}(W_t)-\mu_{GC}J'_{GC}(W_t) \quad (12)$$

In Equation (12), $W_t$ denotes a separation matrix W at time t, and $J'_{SS}(W)$ and $J'_{GC}(W)$ denote complex gradients of $J_{SS}(W)$ and $J_{GC}(W)$. $\mu_{SS}$ and $\mu_{GC}$ are step size parameters.
<Speech Extraction>

An example of a process flow which is performed by the speech extracting unit 16 will be described below.

The speech extracting unit 16 extracts a speech signal by multiplying the separated sound signal by 1 when speech is produced. On the other hand, the speech extracting unit 16 multiplies the separated sound signal by 0 and does not extract a speech signal when no speech is produced. As a result, a speech signal is extracted when speech is produced, and no speech signal is extracted when no speech is produced. For example, in FIG. 6, in the period of times t1 to t2, the speech extracting unit 16 multiplies the sound signal separated as the sound source in the driver seat orientation by "1" in the driver seat orientation included in the sound source localization information S and multiplies the sound signal separated as the sound source in the passenger seat orientation by "0" in the passenger seat orientation included in the sound source localization information S.

When the passenger hu2 does not sit in the passenger seat 22, only the sound source of the driver hu1 is localized. In this case, the sound source of the driver hu1 is localized and a speech section of the driver hu1 is detected by the sound source localizing unit 14. As a result, the speech extracting unit 16 extracts only the speech signal of the driver hu1.

When speech is produced, the speech extracting unit 16 may extract the speech signal corresponding to the sound source having produced the speech constantly or until a silent section is maintained for a predetermined period, as well as in the speech section. For example, when only the passenger hu2 produces speech, the speech extracting unit 16 may extract only the speech signal of the passenger hu2 after changing the sound source localization information S in the passenger seat orientation from "0" to "1".

As described above, the sound source separating device 1 according to this embodiment includes the sound collecting unit 11 that collects sound signals using a plurality of microphones 101, the sound source localizing unit 14 that localizes sound sources on the basis of the sound signals collected by the sound collecting unit, the sound source separating unit 15 that separates the sound signals collected by the sound collecting unit into the sound sources corresponding to the number of fixed sound sources and the fixed sound source directions without using the sound source localization result from the sound source localizing unit, and the speech extracting unit 16 that extracts speech signals of the fixed sound sources on the basis of the sound source localization result from the sound source localizing unit and the sound source separation result from the sound source separating unit.

According to this configuration, in the sound source separating device 1 according to this embodiment, since the number of microphones 101, the number of sound sources, and the sound source directions are fixed, the rows and the columns of the separation matrix W which is used to separate the sound sources do not vary. Accordingly, according to this embodiment, the separation matrix W is stable. As a result, according to this embodiment, the separation matrix W is more stable and thus the sound source separation performance is more stable in comparison with a case in which the sound sources are separated using the directions of the sound sources which are localized.

In the sound source separating device 1 according to this embodiment, the sound source localizing unit 14 detects a speech section for each sound source (the driver hu1 and the passenger hu2), and the speech extracting unit 16 extracts speech signals in a period in which the fixed sound sources (the driver hu1 and the passenger hu2) produce speech on the basis of the sound source localization result and the detected speech section from the sound source localizing unit and the sound source separation result from the sound source separating unit 15.

According to this configuration, in the sound source separating device 1 according to this embodiment, it is possible to extract the speech signal in the utterance period for each sound source. The utterance period is, for example, a period until a silent period is maintained for a predetermined time or more after at least one of the driver hu1 and the passenger hu2 starts an utterance or a speech period which can be considered as a single utterance.

In the sound source separating device 1 according to this embodiment, the sound source separating unit 15 separates the sound signals into the number of sound sources using a separation matrix W and updates the separation matrix for every predetermined time even in a non-utterance period.

According to this configuration, in the sound source separating device 1 according to this embodiment, it is possible to separate the sound sources using the converging separation matrix W. As a result, according to this embodiment, it is possible to stabilize the sound source separation performance.

In the sound source separating device 1 according to this embodiment, the sound source separating unit 15 separates the sound signals into the number of sound sources using a separation matrix W and does not reset the separation matrix when speech is detected.

According to this configuration, since the separation matrix W is not reset but continues to be updated even when speech is detected, the separation matrix is in a converging state and is always stable. As a result, according to this embodiment, it is possible to stabilize the sound source separation performance.

In the sound source separating device 1 according to this embodiment, the fixed sound sources are the driver hu1 in the driver seat and the passenger hu2 in the passenger seat of a vehicle.

According to this configuration, in the sound source separating device 1 according to this embodiment, it is possible to accurately separate the speech signal of the driver hu1 sitting in the driver seat 21 and the speech signal of the passenger hu2 sitting in the passenger seat 22.

In the sound source separating device 1 according to this embodiment, the sound collecting unit 11 is disposed between a driver seat and a passenger seat of a vehicle.

In the sound source separating device 1 according to this embodiment, the sound collecting unit 11 is disposed between a map lamp and an instrument panel.

According to this configuration, in the sound source separating device 1 according to this embodiment, it is possible to collect the speech signal of the driver hu1 sitting in the driver seat 21 and the speech signal of the passenger hu2 sitting in the passenger seat 22.

The sound source separating device 1 according to this embodiment further includes the sound source information storage unit 13 that stores information on the fixed sound sources (for example, the number of sound sources and the sound source directions), and the sound source separating unit 15 separates the sound signals into the number of fixed sound sources using the information stored in the sound source information storage unit.

According to this configuration, in the sound source separating device 1 according to this embodiment, it is possible to perform the sound source separation on the basis of the information of the number of sound sources and the sound source directions stored in the sound source information storage unit using the stable separation matrix W in which the number of rows and the number of columns are fixed.

Second Embodiment

The example in which the number of fixed sound sources is 2 and the number of fixed sound source directions is 2 is described in the first embodiment, but an example in which the number of fixed sound sources is 3 and the number of fixed sound source directions is 3 will be described in this embodiment.

<Description of Fixed Sound Sources>

Figure 8:
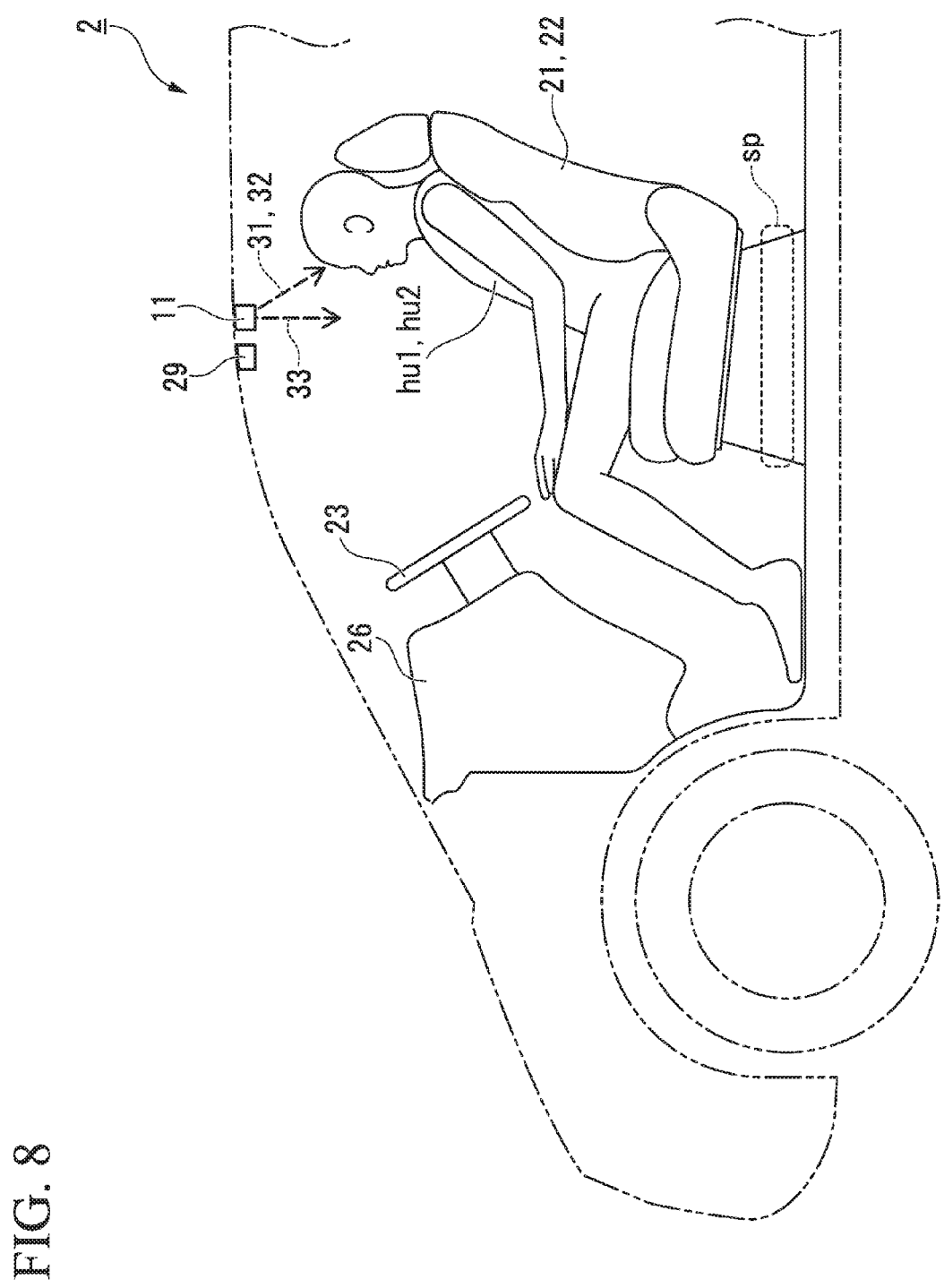
FIG. 8 is a cross-sectional view of a vehicle taken along line A-B in FIG. 1.

FIG. 8 is a cross-sectional view of the vehicle 2 taken along line A-B in FIG. 1.

As illustrated in FIG. 8, a map lamp 29 and a sound collecting unit 11 are disposed on the ceiling of the vehicle 2. A virtual sound source sp is set as a fixed sound source in addition to a driver hu1 and a passenger hu2. Here, the virtual sound source sp is a single virtual sound source virtually including road noise, air conditioner noise (operating sounds and the like), sound signals of a car stereo system, and the like.

A predetermined direction 33 (for example, a downward direction of the sound collecting unit 11) which is different from a sound source direction 31 and a sound source direction 32 corresponding to the first sound source and the second sound source which have been described with reference to FIG. 1 is further set as the fixed sound source directions. The predetermined direction 33 is a direction in which the virtual sound source sp is present.

<Configuration of Sound Source Separating Device>

A sound source separating device 1A will be described below.

Figure 9:
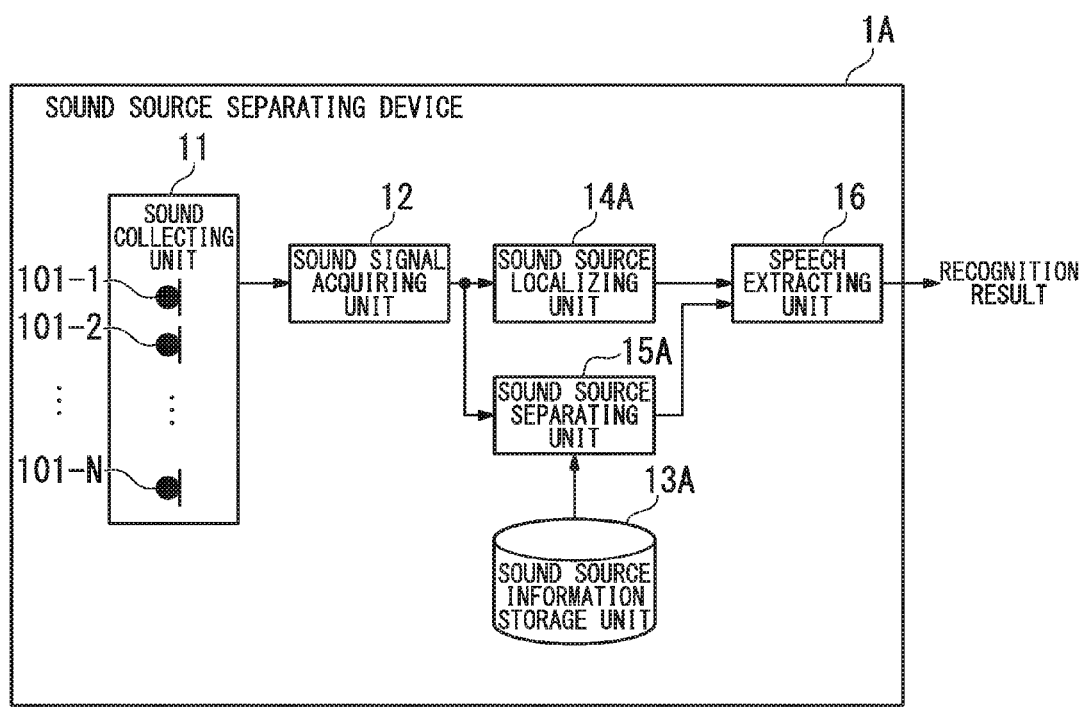
FIG. 9 is a block diagram illustrating a configuration of a sound source separating device according to a second embodiment.

FIG. 9 is a block diagram illustrating a configuration of the sound source separating device 1A according to this embodiment.

As illustrated in FIG. 9, the sound source separating device 1A includes a sound collecting unit 11, a sound signal acquiring unit 12, a sound source information storage unit 13A, a sound source localizing unit 14, a sound source separating unit 15A, and a speech extracting unit 16. Functional units performing the same operations as in the sound source separating device 1 described in the first embodiment will be referenced by the same reference signs and description thereof will not be repeated.

As illustrated in FIG. 10, the number of sound sources, sound source directions, sound-source-localizing transfer functions, and sound-source-separating transfer functions are stored in the sound source information storage unit 13A. FIG. 10 is a diagram illustrating an example of information which is stored in the sound source information storage unit 13A according to this embodiment.

As illustrated in FIG. 10, in the sound source information storage unit 13A, 3 is stored as the number of sound sources, and a driver seat orientation, a passenger seat orientation, and a predetermined direction are stored in correlation therewith as the sound source directions. In the sound source information storage unit 13A, sound-source-localizing transfer functions from the microphones 101 to a predetermined position at a predetermined angle in a direction for each predetermined angle and for each microphone 101 and for each predetermined position are stored. In the sound source information storage unit 13A, sound-source-separating transfer functions to the sound sources (the first sound source, the second source, and the virtual sound source sp) are stored for each microphone 101.

Similarly to the first embodiment, the sound-source-localizing transfer function for each predetermined orientation may be stored in the sound source information storage unit 13A for each microphone 101. In the sound source information storage unit 13A, for example, only the transfer functions mentioned as the sound-source-localizing transfer functions among the transfer functions illustrated in FIG. 10 may be stored. The sound source separating unit 15A may read and use the transfer functions corresponding to the sound source directions and the sound source positions from the sound source information storage unit 13A on the basis of information indicating the directions of the microphones 101 to the sound sources and the positions of the sound sources.

Figures 11, 12:
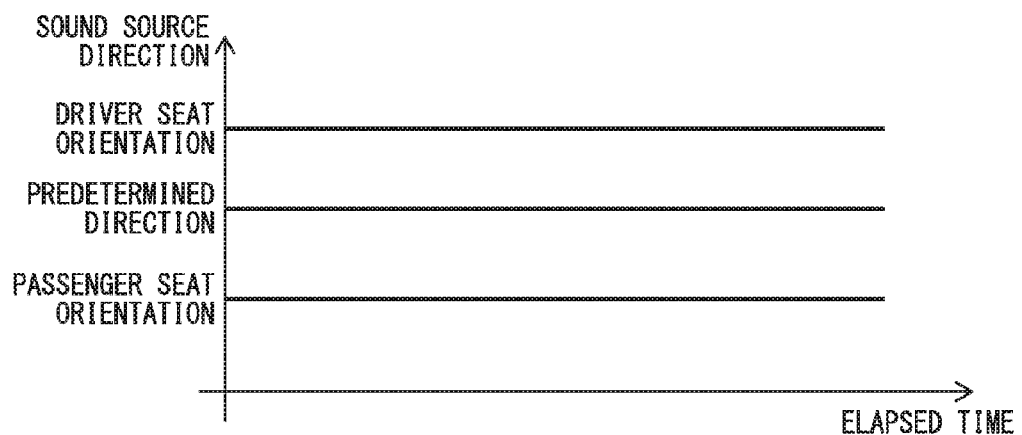
FIG. 11 is a diagram illustrating an example in which the number of sound sources and the sound source directions which are stored in the sound source information storage unit according to the second embodiment are fixed with the passage of time.
FIG. 12 is a diagram illustrating an example of sound source localization information which is output from a sound source localizing unit according to the second embodiment.

As illustrated in FIG. 11, the number of sound sources and the sound source directions do not vary with the passage of time but are fixed. FIG. 11 is a diagram illustrating an example in which the number of sound sources and the sound source directions which are stored in the sound source information storage unit 13A according to this embodiment are fixed with the passage of time. In FIG. 11, the horizontal axis represents the elapsed time and the vertical axis represents the sound source direction. As illustrated in FIG. 11, the number of sound sources is fixed to three sound sources in the driver seat orientation, the passenger seat orientation, and the predetermined direction regardless of the passage of time. The sound source directions are fixed to three directions of the driver seat orientation, the passenger seat orientation, and the predetermined direction regardless of the passage of time.

That is, in this embodiment, noise in the sound source separating device 1A such as road noise and air conditioner noise is absorbed in the virtual sound source sp in the predetermined direction. Accordingly, the separation characteristics of the sound signal in the driver seat orientation and the sound signal in the passenger seat orientation which are separated by the sound source separating unit 15A are more improved than those in the first embodiment.

Description of the sound source separating device 1A will continue with reference to FIG. 9.

The sound source localizing unit 14A estimates the sound source directions of the sound sources in the driver seat orientation, the passenger seat orientation, and the predetermined direction using the sound-source-localizing transfer functions stored in the sound source information storage unit 13A in response to the frequency-domain signals $x_i(\omega)$ input from the sound signal acquiring unit 12. The sound source localizing unit 14A estimates a speech section for each estimated sound source direction, for example, using the MUSIC method. The sound source localizing unit 14A generates sound source localization information S including the estimated sound source directions of the sound sources and the speech section for each estimated sound source direction. The sound source localizing unit 14A outputs the sound source localization information as the estimation result to the speech extracting unit 16.

FIG. 12 is a diagram illustrating an example of the sound source localization information S which is output from the sound source localizing unit 14A according to this embodiment. As illustrated in FIG. 12, in the sound source localization information S, utterances are correlated with the sound source directions for each period. In the period of times t1 to t2, there is an utterance from the driver seat orientation (the first sound source) and thus this is set to "1", there is no utterance from the passenger seat orientation (the second source) and thus this is set to "0", and there is no utterance from the predetermined direction (the virtual sound source sp) and thus this is set to "0". In the period of times t2 to t3, there is an utterance from the driver seat orientation and thus this is set to "1", there is an utterance from the passenger seat orientation and thus this is set to "1", and there is no utterance from the predetermined direction and thus this is set to "0". In the period of times t3 to t4, there is no utterance from the driver seat orientation and thus this is set to "0", there is an utterance from the passenger seat orientation and thus this is set to "1", and there is no utterance from the predetermined direction and thus this is set to "0". In the period of times t4 to t5, there is no utterance from the driver seat orientation and thus this is set to "0", there is no utterance from the passenger seat orientation and thus this is set to "0", and there is no utterance from the predetermined direction does and thus this is set to "0".

Description of the sound source separating device 1 will continue with reference to FIG. 9.

The sound source separating unit 15A separates the frequency-domain signals $x_i(\omega)$ of N channels output from the sound signal acquiring unit 12 into sound signals by sound sources using the number of sound sources, the sound source directions, and the sound-source-separating transfer functions which are stored in the sound source information storage unit 13A. Specifically, the sound source separating unit 15A separates the sound signals into the sound signal in the driver seat orientation, the sound signal in the passenger seat orientation, and the sound signal in the predetermined direction. That is, the sound source separating unit 15A separates the frequency-domain signals $x_j(\omega)$ of N channels into the first sound source and the second sound source using three sound sources of the first sound source in the driver seat orientation, the second sound source in the passenger seat orientation, and the virtual sound source in the predetermined direction, the transfer function corresponding to the first sound source, the transfer function corresponding to the second sound source, and the transfer function corresponding to the virtual sound source which are stored in the sound source information storage unit 13A. The sound source separating unit 15A outputs the separated sound signal in the driver seat orientation and the separated sound signal in the passenger seat orientation among the separated sound signals to the speech extracting unit 16. Even when only the driver hu1 (FIG. 1) sits in the driver seat, the sound source separating unit 15A separates the acquired sound signals into three sound signals in the driver seat orientation, the passenger seat orientation, and the predetermined direction and outputs the sound signal in the driver seat orientation to the speech extracting unit 16.

The sound source separating unit 15A generates a separation matrix W based on the number of sound sources and the sound source directions, for example, using a GHDSS-AS method, and separates the sound signals into sound signals by sound sources using the generated separation matrix W. The initial value of the separation matrix W may be stored in the sound source information storage unit 13A. The sound source separating unit 15A updates the separation matrix W which is an Nx3 matrix using the GHDSS-AS method and separates the sound signals into sound signals by sound sources using the updated separation matrix W.

Unlike in the related art, the sound source separating unit 15A in this embodiment always updates the separation matrix W regardless of detection of speech or detection of a sound source orientation. Unlike in the related art, the sound source separating unit 15A does not reset the separation matrix W even when speech is detected. Accordingly, in this embodiment, the separation matrix W which is used by the sound source separating unit 15A continues to be updated without being reset even when speech is detected. Accordingly, the separation matrix W is in a converged state and thus is always stable. As a result, according to this embodiment, it is possible to stabilize the sound source separation performance.

The sound source separating unit 15A may separate the sound signals into the sound signal in the driver seat orientation, the sound signal in the passenger seat orientation, and the sound signal in the predetermined direction, and may output the separated sound signal in the driver seat orientation, the separated sound signal in the passenger seat orientation, and the separated sound signal in the predetermined direction to the speech extracting unit 16. In this case, the sound source localization information S illustrated in FIG. 12 and output from the sound source localizing unit 14A is input to the speech extracting unit 16. Accordingly, the speech extracting unit 16 may multiply the sound signal in the predetermined direction by 0 and not extract the sound signal of the virtual sound source sp.

<Absorption of Noise by Virtual Sound Source sp>

Here, a reason for enabling the virtual sound source sp in the predetermined direction to absorb noise in the sound source separating device 1A such as road noise, air conditioner noise, and sound signals of a car stereo system by setting the virtual sound source sp to the predetermined direction 33 which is an approximately downward direction of the sound collecting unit 11 (microphone array) will be described.

By changing the sound source direction of the virtual sound source sp and performing the sound source separation, the sound source separation performance is markedly improved when the virtual sound source sp is set to the predetermined direction 33 which is an approximately downward direction of the sound collecting unit 11 (microphone array) as described above.

This is because a time difference between the microphones 101 is not easily caused when the virtual sound source sp is set to the predetermined direction 33 which is an approximately downward direction of the sound collecting unit 11 (microphone array) as described above with reference to FIG. 8. Sound signals of background noise such as road noise, air conditioner noise, and sound signals of a car stereo system have no directivity or little directivity, and thus such noise can be assumed to be located in the orientation of the virtual sound source sp in the sound source direction in which the time difference between the microphones 101 is small. As a result, according to this embodiment, by setting the virtual sound source sp to the predetermined direction 33 which is an approximately downward direction of the sound collecting unit 11 (microphone array), it is possible to absorb noise in the sound source separating device 1A such as road noise, air conditioner noise, and sound signals of a car stereo system in the virtual sound source sp in the predetermined direction. Accordingly, according to this embodiment, it is possible to improve the sound source separation performance more than that in the first embodiment.

<Process of Sound Source Separating Device 1A>

An example of the flow of a process which is performed by the sound source separating device 1 will be described below.

Figure 13:
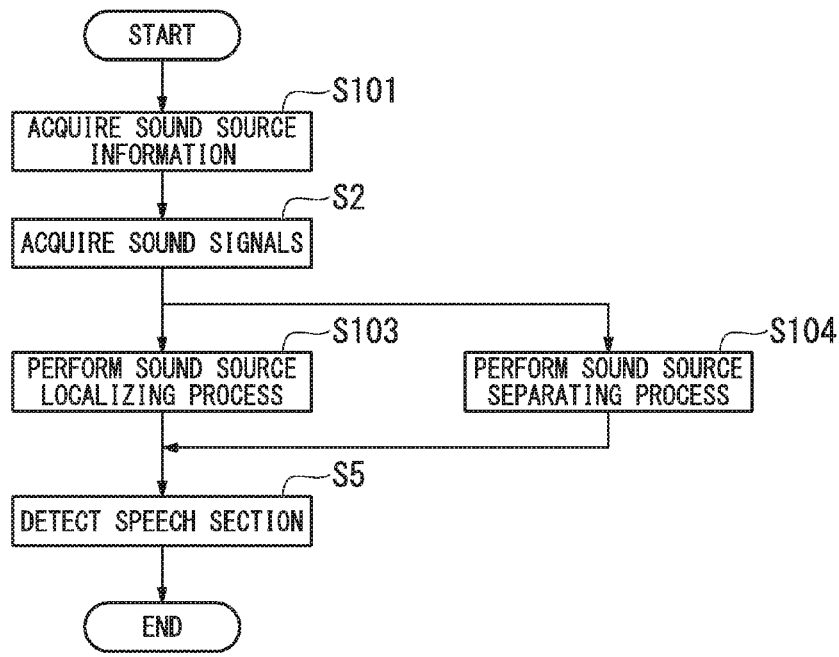
FIG. 13 is a flowchart illustrating an example of a process which is performed by the sound source separating unit according to the second embodiment.
Figure 14:
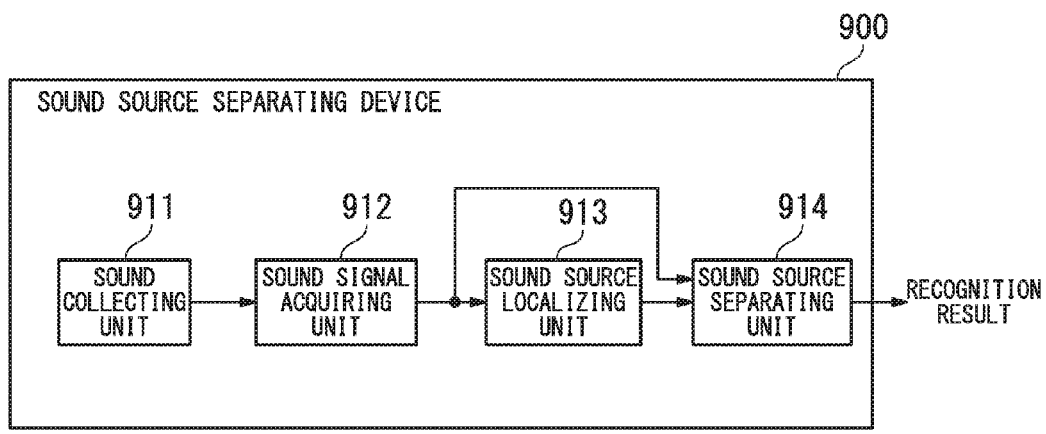
FIG. 14 is a block diagram illustrating a schematic configuration of a sound source separating device according to the related art.

FIG. 13 is a flowchart illustrating an example of a process which is performed by the sound source separating device 1A according to this embodiment. The same processes as illustrated in FIG. 7 will be referenced by the same reference signs.

(step S101) The sound source separating unit 15A reads the sound-source-separating transfer functions corresponding to the number of sound source directions and the directions and positions of separation targets which are stored in the sound source information storage unit 13A.

(step S102) The sound signal acquiring unit 12 performs the process of step S2.

(step S103) The sound source localizing unit 14A reads a plurality of sound-source-localizing transfer functions which are stored in the sound source information storage unit 13A. Subsequently, the sound source localizing unit 14A performs estimation of the sound source directions of the sound sources and estimation of a speech section for each sound source on the N sound signals output from the sound signal acquiring unit 12 on the basis of the read plurality of sound-source-localizing transfer functions read from the sound source information storage unit 13A, for example, using the MUSIC method. Subsequently, the sound source localizing unit 14A generates the sound source localization information S including the estimated sound source directions of the sound sources and the speech section for each sound source.

(step S104) The sound source separating unit 15A separates the N sound signals output from the sound signal acquiring unit 12 into the sound signals by sound sources on the basis of the number of sound source directions and the sound-source-separating transfer functions corresponding to the directions and positions of the separation targets which are read from the sound source information storage unit 13A, for example, using the GHDSS-AS method.

The process of step S103 and the process of step S104 are performed in parallel.

(step S5) The speech extracting unit 16 performs the process of step S5.

The sound source separating device 1A performs the processes of steps S2, S103, S104, and S5, for example, for each frame.

As described above, in the sound source separating device 1A according to this embodiment, it is possible to additionally allocate a sound source other than the driver and the passenger to the predetermined fixed sound sources.

According to this configuration, in the sound source separating device 1A according to this embodiment, noise in the sound source separating device 1A such as road noise, air conditioner noise, and sound signals of a car stereo system is absorbed in the virtual sound source sp in the predetermined direction. Accordingly, in this embodiment, the separation characteristics of the sound signal in the driver seat orientation and the sound signal in the passenger seat orientation which are separated by the sound source separating unit 15A are improved more than those in the first embodiment.

In the first and second embodiments, the sound source localizing unit 14 or 14A performs the sound source localization on only two directions of the driver seat orientation and the passenger seat orientation which are fixed, but the present invention is not limited to this configuration. The sound source localizing unit 14 or 14A may perform the sound source localization on a sound source in another direction. In this case, for example, the speech extracting unit 16 may use the information indicating the speech section included in the sound source localization information S for the sound sources in two directions of the driver seat orientation and the passenger seat orientation among the sound sources which are localized.

In the first and second embodiments, the sound source separating device 1 (or 1A) is installed in a vehicle, but the present invention is not limited to this configuration. The sound source separating device 1 (or 1A) may be mounted in a ship, an airplane, or the like. Alternatively, the sound source separating device may be mounted in a conference room in which a plurality of participants commonly use the microphones 101 in a conference. That is, the sound source separating device may be applied to anything in which positions of speakers, the number of speakers, and directions of the speakers (sound source directions) can be fixed.

All or a part of the sound source separating device 1 (or 1A) may be embodied by a smart phone, a tablet terminal, a portable game machine, or the like. In this case, the smart phone, the tablet terminal, the portable game machine, or the like may include a plurality of microphones 101, or the smart phone, the tablet terminal, the portable game machine, or the like may acquire sound signals from the sound collecting unit 11 in a wired or wireless manner.

All or a part of the information stored in the sound source information storage unit 13 or 13A may be stored in a server (not illustrated) which is connected via a network. In this case, the sound source separating device 1 (or 1A) may include a communication unit (not illustrated) and acquire sound source information (such as the number of sound sources, the sound source directions, and the transfer functions).

In the first and second embodiments, the extracted speech signals are output to the car navigation, but the present invention is not limited to this configuration. The extracted speech signals may be used for a device that performs a process using speech, for example, opening/closing control of a power window of a vehicle 2.

The sound source localization, the sound source separation, and the speech signal extraction may be performed by recording a program for realizing the functions of the sound source separating device 1 (or 1A) according to the present invention on a non-transitory computer-readable recording medium and causing a computer system to read and execute the program recorded on the recording medium. Here, the "computer system" includes an operating system (OS) or hardware such as peripherals. For example, the "computer system" may include a WWW system having a homepage providing environment (or display environment). Examples of the "computer-readable recording medium" include a portable medium such as a flexible disk, a magneto-optical disc, a read only memory (ROM), and a compact disc (CD)-ROM and a storage device such as a hard disk built in a computer system. The "computer-readable recording medium" may include a medium that holds a program for a predetermined time, like a volatile memory (RAM)) in a computer system serving as a server or a client when a program is transmitted via a network such as the Internet or a communication line such as a telephone circuit.

The program may be transmitted from a computer system storing the program in a storage device or the like to another computer system via a transmission medium or by transmission waves in the transmission medium. Here, the "transmission medium" via which the program is transmitted means a medium having a function of transmitting information such as a network (communication network) such as the Internet or a communication circuit (communication line) such as a telephone line. The program may be configured to realize a part of the above-mentioned functions. The program may be a program capable of realizing the above-mentioned functions in combination with a program recorded in advance in a computer system, that is, a so-called differential file (differential program).

What is claimed is:

1. A sound source separating device comprising:
   a sound collecting unit configured to collect sound signals using a plurality of microphones;
   a sound source localizing unit configured to localize a sound source on the basis of the sound signals collected by the sound collecting unit;
   a sound source separating unit configured to separate the sound signals collected by the sound collecting unit into sound sources corresponding to a number of fixed sound sources and fixed sound source directions without using the sound source localization result from the sound source localizing unit; and
   a speech extracting unit configured to extract speech signals of the fixed sound sources on the basis of the sound source localization result from the sound source localizing unit and the sound source separation result from the sound source separating unit.

2. The sound source separating device according to claim 1, wherein the sound source localizing unit detects a speech section for each sound source, and
   the speech extracting unit extracts speech signals in a period in which the fixed sound sources produce speech on the basis of the sound source localization result and the detected speech section from the sound source localizing unit and the sound source separation result from the sound source separating unit.

3. The sound source separating device according to claim 1, wherein the sound source separating unit separates the sound signals into the number of the fixed sound sources using a separation matrix and updates the separation matrix for every predetermined time even in a non-utterance period.

4. The sound source separating device according to claim 1, wherein the sound source separating unit separates the sound signals into the number of sound sources using a separation matrix and does not reset the separation matrix when speech is detected.

5. The sound source separating device according to claim 1, wherein the fixed sound sources are a driver in a driver seat and a passenger in a passenger seat of a vehicle.

6. The sound source separating device according to claim 5, wherein a sound source other than the driver and the passenger is additionally allocated to the fixed sound sources.

7. The sound source separating device according to claim 1, wherein the sound collecting unit is disposed between a driver seat and a passenger seat of a vehicle.

8. The sound source separating device according to claim 1, wherein the sound collecting unit is disposed between a map lamp and an instrument panel.

9. The sound source separating device according to claim 1, further comprising a sound source information storage unit configured to store information on the fixed sound sources,
wherein the sound source separating unit separates the sound signals into a number of the fixed sound sources using the information stored in the sound source information storage unit.

10. A sound source separating method comprising:
a sound collecting step of collecting sound signals using a plurality of microphones;
a sound source localizing step of localizing a sound source on the basis of the sound signals collected in the sound collecting step;
a sound source separating step of separating the sound signals collected in the sound collecting step into sound sources corresponding to the number of fixed sound sources and fixed sound source directions without using the sound source localization result in the sound source localizing step; and
a speech extracting step of extracting speech signals of the fixed sound sources on the basis of the sound source localization result in the sound source localizing step and the sound source separation result in the sound source separating step.

* * * * *